(12) United States Patent  
Iwazaki et al.

(10) Patent No.: US 12,323,046 B2  
(45) Date of Patent: Jun. 3, 2025

(54) POWER CONVERSION DEVICE AND AIR CONDITIONER

(71) Applicant: Mitsubishi Electric Corporation, Tokyo (JP)

(72) Inventors: Kenji Iwazaki, Tokyo (JP); Mamoru Kamikura, Tokyo (JP); Kazunori Sakanobe, Tokyo (JP); Koji Rikukawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 193 days.

(21) Appl. No.: 18/251,730

(22) PCT Filed: Dec. 24, 2020

(86) PCT No.: PCT/JP2020/048546  
§ 371 (c)(1),  
(2) Date: May 4, 2023

(87) PCT Pub. No.: WO2022/137456  
PCT Pub. Date: Jun. 30, 2022

(65) Prior Publication Data  
US 2023/0412065 A1 Dec. 21, 2023

(51) Int. Cl.  
*H02P 1/00* (2006.01)  
*H02M 1/12* (2006.01)  
(Continued)

(52) U.S. Cl.  
CPC ........... *H02M 1/12* (2013.01); *H02M 5/4585* (2013.01); *H02P 27/06* (2013.01); *F25B 2500/12* (2013.01); *F25B 2600/021* (2013.01)

(58) Field of Classification Search  
CPC ........ H02M 1/12; H02M 5/4585; H02P 27/06  
(Continued)

(56) References Cited

U.S. PATENT DOCUMENTS

2016/0210987 A1* 7/2016 Sugiyama ........... G10L 21/0232  
2016/0217803 A1* 7/2016 Sugiyama ........... G10L 21/0232  
(Continued)

FOREIGN PATENT DOCUMENTS

JP 2003-182943 A 7/2003  
WO 2018/109801 A1 6/2018

OTHER PUBLICATIONS

International Search Report of the International Searching Authority mailed Mar. 23, 2021 for the corresponding international application No. PCT/JP2020/048546 (and English translation).

*Primary Examiner* — Erick D Glass  
(74) *Attorney, Agent, or Firm* — Posz Law Group, PLC

(57) ABSTRACT

A power conversion device supplies power to a load. The power conversion device includes a power conversion unit, a control unit, a noise suppression unit, and an error detection unit. The power conversion unit receives power from a first power source. The control unit controls the power conversion unit. The noise suppression unit is connected between the first power source and the power conversion unit and outputs a noise suppression signal to suppress noise generated from the power conversion unit. When an error condition is established, the error detection unit detects an error. The error condition indicates that the error has occurred in the power conversion device or the load. The error condition includes a condition that an amount of noise generated from the power conversion unit is larger than a reference value.

10 Claims, 6 Drawing Sheets

(51) Int. Cl.
*H02M 5/458* (2006.01)
*H02P 1/28* (2006.01)
*H02P 3/00* (2006.01)
*H02P 7/06* (2006.01)
*H02P 27/06* (2006.01)

(58) Field of Classification Search
USPC .................................................... 318/504
See application file for complete search history.

(56) References Cited

U.S. PATENT DOCUMENTS

2017/0037844 A1\* 2/2017 Takeuchi ................ F04B 49/10
2020/0083835 A1 3/2020 Kobayashi et al.

\* cited by examiner

POWER CONVERSION DEVICE AND AIR CONDITIONER

CROSS REFERENCE TO RELATED APPLICATION

This application is a U.S. national stage application of PCT/JP2020/048546 filed on Dec. 24, 2020, the contents of which are incorporated herein by reference.

TECHNICAL FIELD

The present disclosure relates to a power conversion device and an air conditioner comprising the power conversion device.

BACKGROUND ART

A conventionally known device suppresses noise generated from a power conversion device. For example, Japanese Patent Application Laying-Open No. 2003-182943 (PTL 1) discloses a noise compensation device that detects a noise current generated from an inverter drive device that supplies electric power to an electric motor. The noise compensation device amplifies the detected noise current by an amplification circuit to generate a noise compensating current of an opposite phase, and supplies the noise compensating current to a ground line of the electric motor to cancel the noise current. In the configuration disclosed in PTL 1, when an error occurs in the noise compensation device itself, the error is detected, and an alarm is issued and operation is restricted to reduce an amount of noise flowing out.

CITATION LIST

Patent Literature

PTL 1: Japanese Patent Laying-Open No. 2003-182943

SUMMARY OF INVENTION

Technical Problem

In the configuration disclosed in PTL 1, when an error occurs in the noise compensation device, the error is indicated by detecting an increase in an amount of noise flowing out to a power source and the ground line (or the amount of noise flowing out). However, there are factors other than the error of the noise compensation device that increase the amount of noise flowing out to a power supply line. Examples of such factors include an error of a converter or an inverter included in the inverter drive device, and a state of a load receiving power from the inverter. According to the configuration disclosed in PTL 1, it can be difficult to detect an error other than an error of the noise compensation device.

The present disclosure has been made to solve the above-described problem, and an object of the present disclosure is to improve accuracy of detection of an error occurring in a power conversion device supplying a load with power and in the load.

Solution to Problem

A power conversion device according to the present disclosure supplies power to a load. The power conversion device comprises a power conversion unit, a control unit, a noise suppression unit, and an error detection unit. The power conversion unit is supplied with power from a first power source. The control unit controls the power conversion unit. The noise suppression unit is connected between the first power source and the power conversion unit, and outputs a noise suppression signal that suppresses noise generated from the power conversion unit. When an error condition is established, the error detection unit detects an error. The error condition indicates that the error has occurred in the power conversion device or the load. The error condition includes a condition that an amount of noise generated from the power conversion unit is larger than a reference value.

Advantageous Effects of Invention

According to the power conversion device of the present disclosure, when an error condition including a condition that an amount of noise generated from a power conversion unit is larger than a reference value is established, an error detection unit detects an error of the power conversion device or an error of a load, and accuracy of detection of the error caused in the power conversion device and the load can be improved.

DESCRIPTION OF EMBODIMENTS

Hereinafter, embodiments of the present disclosure will be described in detail with reference to the drawings. The present disclosure is not limited to the following embodiments. In the following description, electrical connection is simply referred to as "connection." In the figures, identical or corresponding components are identically denoted and will not be described redundantly in principle.

First Embodiment

Figure 1:
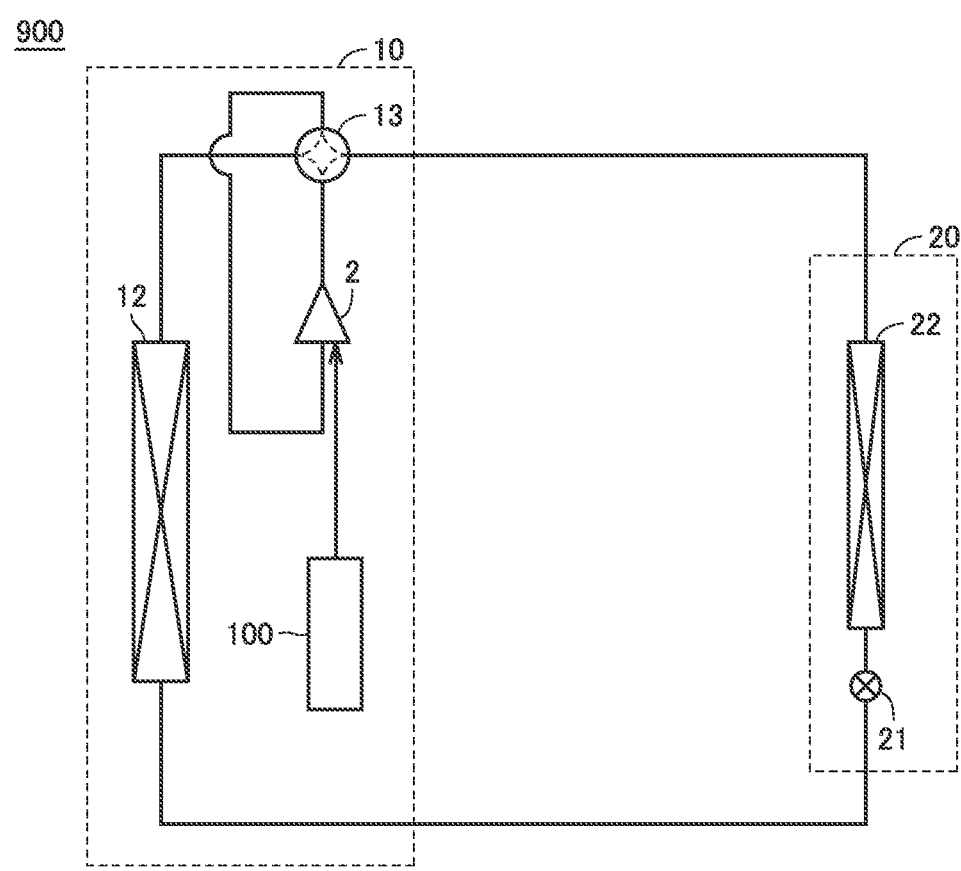
FIG. 1 is a functional block diagram showing a configuration of an air conditioner according to a first embodiment.

FIG. 1 is a functional block diagram showing a configuration of an air conditioner 900 according to a first embodiment. As shown in FIG. 1, air conditioner 900 comprises an outdoor unit 10 and an indoor unit 20. Outdoor unit 10 includes a compressor 2, a heat exchanger 12, a four-way valve 13, and a power conversion device 100. Indoor unit 20 includes an expansion valve 21 and a heat exchanger 22. Power conversion device 100 supplies power to compressor 2. Power conversion device 100 may be integrated with compressor 2.

As its modes of operation, air conditioner 900 includes a heating mode, a cooling mode, and a defrosting mode. In the heating mode, four-way valve 13 allows a discharge port of compressor 2 to be in communication with heat exchanger 22 and also allows heat exchanger 12 to be in communication with a suction port of compressor 2. In the heating mode, refrigerant circulates in the order of compressor 2, four-way valve 13, heat exchanger 22, expansion valve 21, heat exchanger 12, and four-way valve 13. In the cooling mode and the defrosting mode, the discharge port of compressor 2 is allowed to be in communication with heat exchanger 12, and heat exchanger 22 is allowed to be in communication with the suction port of compressor 2. In the cooling mode and the defrosting mode, the refrigerant circulates in the order of compressor 2, four-way valve 13, heat exchanger 12, expansion valve 21, heat exchanger 22, and four-way valve 13.

Figure 2:
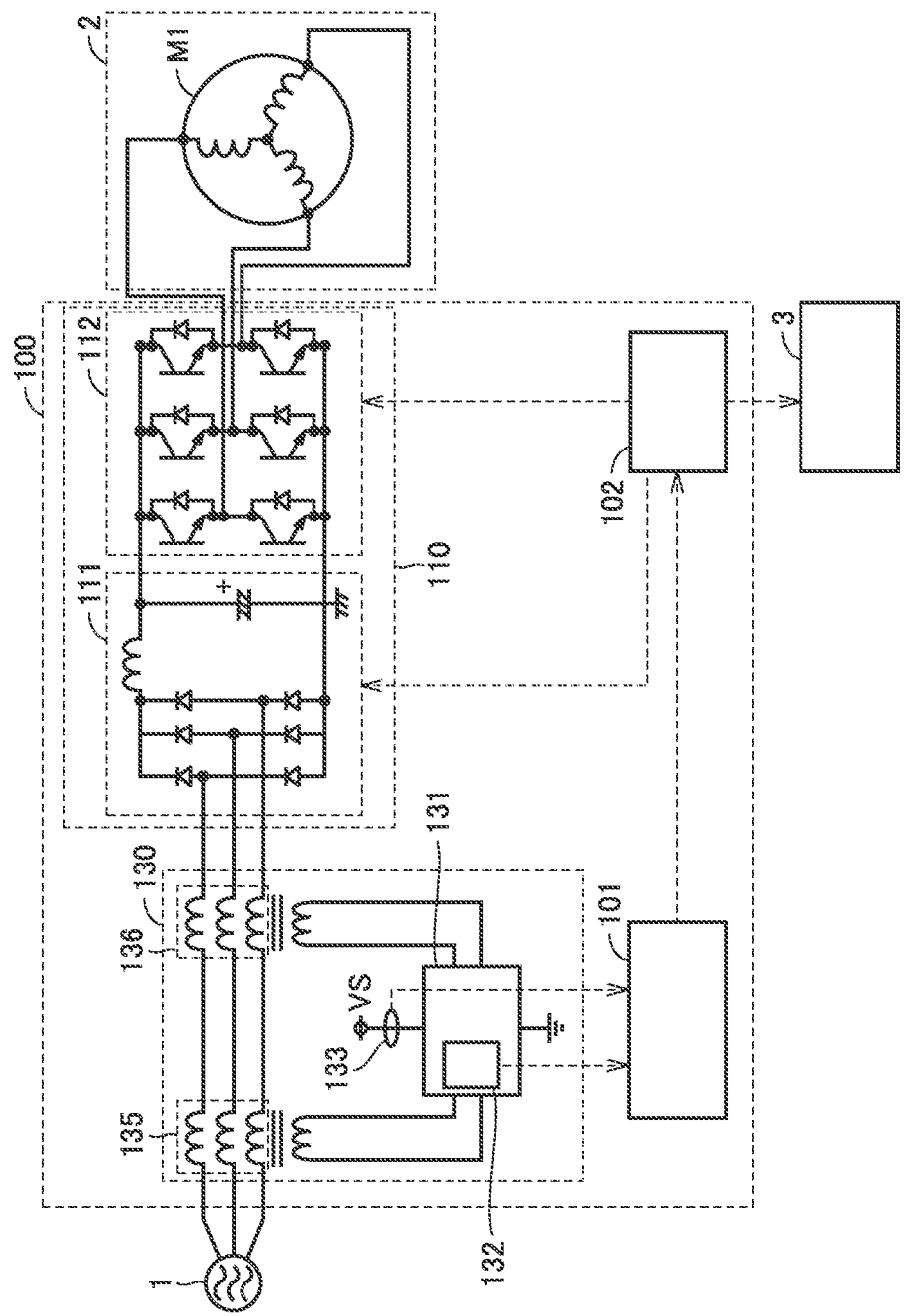
FIG. 2 is a functional block diagram showing a configuration of a power conversion device shown in FIG. 1.

FIG. 2 is a functional block diagram showing a configuration of power conversion device 100 shown in FIG. 1. Power conversion device 100 includes an error detection unit 101, a control unit 102, a power conversion unit 110, and a noise suppression unit 130. Power conversion device 110 receives power from a system power source 1 (a first power source). Control unit 102 controls power conversion unit 110. Power conversion unit 110 includes a converter 111 and an inverter 112. Power conversion device 100 receives three-phase alternating-current (AC) power from system power source 1 (the first power source) through three power lines, converts the received three-phase AC power, and outputs AC power to compressor 2. That is, power conversion device 100 is a three-phase, three-line power conversion device.

Converter 111 receives three-phase AC power output from system power source 1, coverts the received three-phase AC power into direct-current (DC) power, and outputs the DC power to inverter 112. Converter 111 may be a passive converter that performs AC/DC conversion using a passive element such as a diode, or an active converter that includes a switching element such as IGBT (Insulated Gate Bipolar Transistor), MOSFET (Metal-Oxide-Semiconductor Field Effect Transistor) or HEMT (High Electron Mobility Transistor). Any of the systems has a rectifier unit having elements combined in the form of a bridge. Further, the passive element and the switching element may be used in combination. The description of the embodiment does not limit how many phases are applied and how each element is combined with another.

Inverter 112 receives DC power output from converter 111, coverts the received DC power into AC power, and outputs the AC power to a motor M1 of compressor 2 (or a load). Inverter 112 includes a plurality of semiconductor switches. Each of the plurality of semiconductor switches is, for example, a switching element such as IGBT, MOSFET, or HEMT. Inverter 112 has the switching elements controlled to be selectively switched on/off to control a path for a current flowing to compressor 2 to drive compressor 2.

A noise suppression unit 130 is connected between converter 111 and system power source 1. Noise suppression unit 130 receives power from a controlled power source VS (a second power source). Noise suppression unit 130 includes a noise suppression signal generation unit 131, an input signal detection unit 132, a power source detection unit 133, an input unit 135, and an output unit 136. Noise suppression unit 130 receives AC power from system power source 1 at input unit 135, and outputs the AC power at output unit 136 to converter 111. A power supply line (or a bus) connected to system power source 1 includes a noise current from power conversion unit 110. The noise current is input to noise suppression signal generation unit 131. Noise suppression signal generation unit 131 outputs a noise suppression signal to the power supply line for suppressing the noise current. The noise suppression signal reduces the noise current flowing through the power supply line. As a result, an amount of noise flowing out from power conversion device 100 is reduced. While in FIG. 1 detecting a noise current and outputting a noise suppression signal are done via a transformer, doing so is not limited to doing so via a transformer, and the transformer may be replaced with a capacitor or the like.

Input signal detection unit 132 monitors at least one of a voltage and a current input to input unit 135 of noise suppression unit 130, and outputs at least one of the voltage value and the current value to error detection unit 101.

Power source detection unit 133 monitors at least one of a voltage and a current of controlled power source VS for noise suppression signal generation unit 131, and outputs at least one of the voltage value and the current value to error detection unit 101.

Error detection unit 101 determines whether power conversion device 100 and compressor 2 are normal or abnormal by using at least one of a signal from input signal detection unit 132 and a signal from power source detection unit 133. When power conversion device 100 or compressor 2 is abnormal, error detection unit 101 transmits a signal indicating the error (an error signal) to control unit 102.

In response to the error signal received from error detection unit 101, control unit 102 changes a mode of operation of inverter 112 and converter 111 and signals controller 3 external to power conversion device 100 that an error has occurred in power conversion device 100 or compressor 2.

Control unit 102 performs an operation of heating compressor 2 (IH (Induction Heating) constraint energization) so that torque is not generated when compressor 2 stops. When control unit 102 receives an error signal during IH constraint energization, control unit 102 changes a mode of IH constraint energization. An operation when changing the mode of IH constraint energization may for example be any one of changing a carrier frequency, decomposing a carrier frequency in bandwidth, and stopping an output of IH constraint energization. These modes of operation may be stored in control unit 102 in advance as a command signal, and a mode of operation may be selected depending on the situation by using the error signal.

Converter 111 operates in modes including a boost mode, a non-boost mode (for rectification alone), and a stop mode. When control unit 102 receives an error signal while converter 111 operates in the boost mode, control unit 102 controls converter 111 to reduce an amount ΔVdc by which converter 111 increases voltage. Amount ΔVdc by which voltage is increased is represented as a difference between a bus voltage Vdc at the time of non-boosting and a bus voltage Vdc_h at the time of boosting by the following equation (1):

$$\Delta Vdc = Vdc\_h - Vdc \qquad (1)$$

Control unit 102 continues to decrease bus voltage Vdc_h until the error signal is inactivated. When amount ΔVdc by which voltage is increased is zeroed or the non-boost mode is entered, and the error signal is still active, control unit 102 changes a mode of operation of inverter 112.

Inverter 112 operates in modes including a normal mode and an output suppression mode. When control unit 102 receives an error signal while inverter 112 operates in the normal mode of operation, control unit 102 changes the mode of operation of inverter 112 to the output suppression mode, and continues to decrease an output of inverter 112 until the error signal is inactivated by error detection unit

101. When inverter 112 operates in the output suppression mode, control unit 102 notifies controller 3 that inverter 112 operates in the output suppression mode.

When the error signal is not inactivated by error detection unit 101, and the output of inverter 112 continues to decrease and is thus zeroed, control unit 102 stops power conversion device 100 and outputs an abort signal to controller 3. Controller 3 may be a centralized controller that centrally controls air conditioner 900, a computer having a function to control air conditioner 900, or a cloud device provided on a network.

Error detection unit 101 calculates in magnitude a noise signal received from input signal detection unit 132 or a specific frequency component included in the noise signal. When an amount of noise from power conversion unit 110 is larger than a reference value (that is, when the noise signal exceeds the reference value in magnitude, or when the specific frequency component is equal to or larger than a reference value), error detection unit 101 determines that an error has occurred in power conversion device 100 or compressor 2, and error detection unit 101 outputs an error signal to control unit 102.

When a voltage value from power source detection unit 133 is close to 0 (that is, when the voltage value is equal to or smaller than a lower limit value) or when a current value therefrom is equal to or larger than an upper limit value, error detection unit 101 determines that noise suppression signal generation unit 131 short-circuits and thus fails, and error detection unit 101 outputs an error signal to control unit 102. Further, when the voltage value is higher than a normal applied voltage (that is, when the voltage value is equal to or larger than an upper limit value) or when the current value is close to 0 (that is, when the current value is equal to or less than a lower limit value set for the current), error detection unit 101 determines that noise suppression signal generation unit 131 open-circuits and thus fails, and error detection unit 101 outputs an error signal to control unit 102.

Error detection unit 101 may learn a state of power conversion device 100 and compressor 2 through machine-learning using at least one of a detected value of an input signal of noise suppression unit 130 and a detected value of an output signal of noise suppression unit 130 as training data. In that case, error detection unit 101 infers (or outputs) an error or symptom thereof of power conversion unit 110 and compressor 2 from at least one of the detected value of the input signal and the detected value of the output signal. Machine learning can for example be supervised learning, unsupervised learning, reinforcement learning, or the like.

Figure 3:
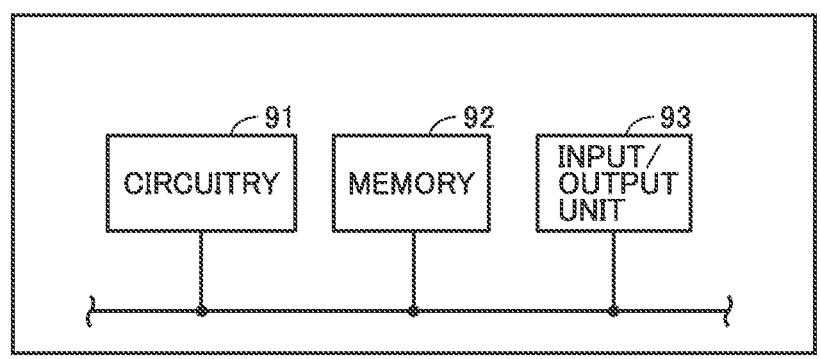
FIG. 3 is a functional block diagram showing a configuration of a control unit shown in FIG. 2.

FIG. 3 is a functional block diagram showing a configuration of control unit 102 shown in FIG. 2. As shown in FIG. 2, control unit 102 includes circuitry 91, a memory 92, and an input/output unit 93. Circuitry 91 may be dedicated hardware or a CPU (Central Processing Unit) that executes a program stored in memory 92. When circuitry 91 is dedicated hardware, circuitry 91 corresponds for example to a single circuit, a composite circuit, a programmed processor, a parallel-programmed processor, an application specific integrated circuit (ASIC), a field programmable gate array (FPGA), or a combination thereof. When circuitry 91 is a CPU, control unit 102 has functionality implemented by software, firmware, or a combination of software and firmware. The software or firmware is described as a program and stored in memory 92. Circuitry 91 reads and executes a program stored in memory 92. Memory 92 includes a non-volatile or volatile semiconductor memory (e.g., random access memory (RAM), read only memory (ROM), flash memory, erasable programmable read only memory (EPROM), or electrically erasable programmable read only memory (EEPROM)), and a magnetic disk, a flexible disk, an optical disk, a compact disk, a mini disk, or a digital versatile disc (DVD). Note that the CPU is also called a central processing unit, a processing unit, an arithmetic unit, a microprocessor, a microcomputer, a processor, or a DSP (Digital Signal Processor).

Input/output unit 93 receives an operation from a user and outputs a processing result to the user. Input/output unit 93 includes, for example, a mouse, a keyboard, a touch panel, a display, and a speaker.

Figure 4:
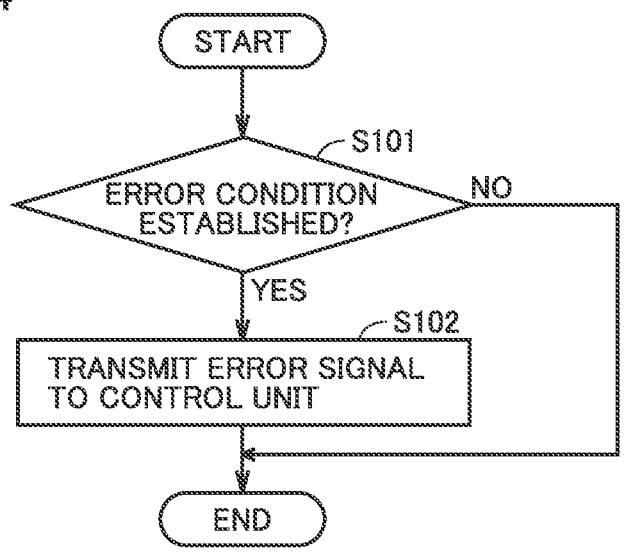
FIG. 4 is a flowchart showing a flow of error determination process performed by an error detection unit shown in FIG. 2.

FIG. 4 is a flowchart showing a flow of an error determination process performed by error detection unit 101 shown in FIG. 2. The FIG. 4 process is performed at fixed time intervals. Hereinafter, a step is simply referred to as S.

As shown in FIG. 4, error detection unit 101 determines in S101 whether an error condition indicating that an error has occurred in power conversion device 100 or compressor 2 is established. When the error condition is established (YES in S101), error detection unit 101 transmits an error signal to control unit 102 and ends the process. When the error condition is not established (NO in S101), error detection unit 101 ends the process.

The error condition in S101 includes a condition that an amount of noise from power conversion unit 110 is larger than a reference value (that is, a condition indicating decreased noise suppression performance of noise suppression unit 130). Noise from power conversion unit 110 is attributed to an error of converter 111, an error of inverter 112, or an error of compressor 2 receiving power from inverter 112, and when the error condition is established, an error caused in the power conversion device and the load can be detected with high accuracy.

Further, the error condition in S101 can include, for example, a condition that a noise signal input from input signal detection unit 132 has a magnitude exceeding a reference value, or a condition that the noise signal includes a specific frequency component having a magnitude equal to or larger than a reference value. Further, the error condition may include at least one of a condition that a voltage value input from power source detection unit 133 does not fall within a predetermined range and a condition that a current value input from power source detection unit 133 does not fall within a predetermined range.

Figure 5:
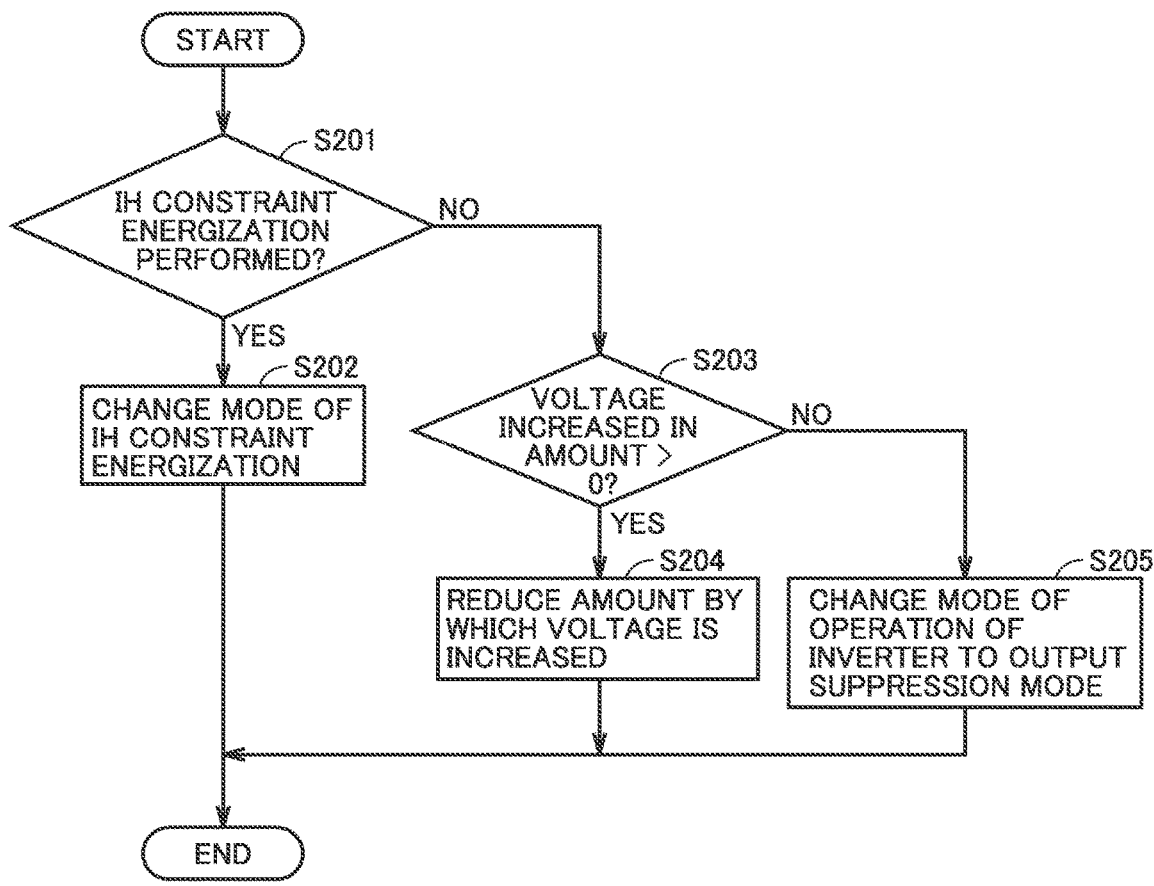
FIG. 5 is a flowchart showing a flow of process performed by the control unit shown in FIG. 2 in response to the control unit receiving an error signal from the error detection unit.

FIG. 5 is a flowchart showing a flow of a process performed by the FIG. 2 control unit 102 in response to control unit 102 receiving an error signal from error detection unit 101. As shown in FIG. 5, control unit 102 determines in S201 whether IH constraint energization is performed for compressor 2. When control unit 102 performs IH constraint energization (YES in S201), control unit 102 changes a mode of IH constraint energization in S202 and ends the process.

When control unit 102 does not perform IH constraint energization (NO in S201), control unit 102 determines in S203 whether converter 111 boosts voltage in an amount larger than 0. When the amount is larger than 0 (YES in S203), control unit 102 proceeds to S204 to decrease the amount, and ends the process. When the amount is 0 (NO in S203), control unit 102 proceeds to S205 to change a mode of operation of inverter 112 to the output suppression mode, and ends the process.

The power conversion device of the first embodiment can thus improve accuracy of detecting an error caused in the power conversion device and a load.

Second Embodiment

Figure 6:
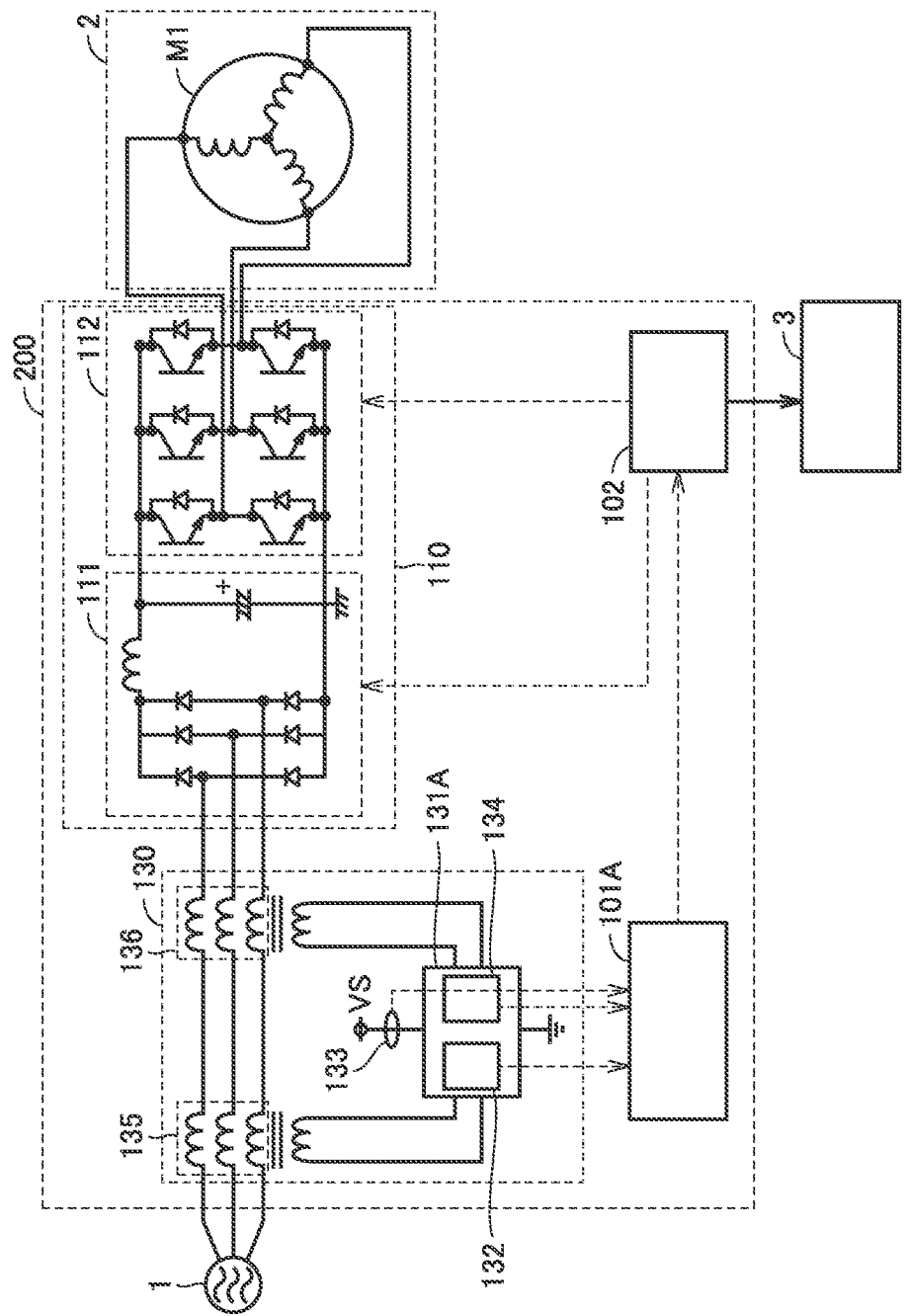
FIG. 6 is a diagram showing a configuration of a power conversion device 200 according to a second embodiment.

FIG. 6 is a diagram showing a configuration of a power conversion device 200 according to a second embodiment. The configuration of power conversion device 200 according to the second embodiment is a configuration in which the FIG. 2 error detection unit 101 and noise suppression signal generation unit 131 are replaced with an error detection unit 101A and a noise suppression signal generation unit 131A, respectively. Noise suppression signal generation unit 131A has a configuration corresponding to that of the FIG. 2 noise suppression signal generation unit 131 plus an output signal detection unit 134. The remainder is identical, and accordingly, will not be described repeatedly.

As shown in FIG. 6, output signal detection unit 134 monitors at least one of a voltage and a current of output unit 136, and outputs at least one of the voltage value and the current value to error detection unit 101A. Error detection unit 101A determines whether power conversion device 200 and compressor 2 are normal or abnormal by using at least one of a signal from noise suppression signal generation unit 131, a signal from input signal detection unit 132, and a signal from power source detection unit 133. When power conversion device 200 or compressor 2 is not normal, error detection unit 101A transmits an error signal to control unit 102.

When the voltage value of output unit 136 is close to 0 (that is, when the voltage value is lower than a lower limit value) or when the current value of output unit 136 is larger than a reference current (that is, when the current value is larger than an upper limit value), error detection unit 101A determines that noise suppression signal generation unit 131 short-circuits and thus fails or noise suppression unit 130 oscillates, and error detection unit 101A outputs an error signal to control unit 102.

Error detection unit 101A calculates a magnitude of a noise signal input from output signal detection unit 134 or a specific frequency component included in the noise signal. When the noise signal has a magnitude exceeding the reference value, or when the specific frequency component is equal to or larger than a reference value, error detection unit 101A determines that power conversion unit 110 or compressor 2 is abnormal, and error detection unit 101A outputs an error signal to control unit 102.

When output unit 136 has a voltage value higher than a normal applied voltage (that is, when the voltage value is higher than an upper limit value) or when output unit 136 has a current value close to 0 (that is, when the current value is lower than a lower limit value), error detection unit 101A determines that noise suppression signal generation unit 131 open-circuits and thus fails or noise suppression unit 130 oscillates, and error detection unit 101A outputs an error signal to control unit 102.

Error detection unit 101 compares a signal from input signal detection unit 132 (or an input signal of noise suppression unit 130) with a signal from output signal detection unit 134 (or an output signal of noise suppression unit 130). When the output signal is smaller than the input signal, error detection unit 101A determines that noise suppression signal generation unit 131 fails, and error detection unit 101A outputs an error signal to control unit 102.

An error condition determined by error detection unit 101A for whether the error condition is established or not includes, for example, at least one of the error condition described in the first embodiment, a condition that output unit 136 has a voltage value smaller than a reference voltage, a condition that output unit 136 does not have a current value falling within a predetermined range, and a condition that output unit 136 does not have a voltage value falling within a predetermined range.

The power conversion device of the second embodiment can thus improve accuracy of detecting an error caused in the power conversion device and a load.

While system power source 1 is an AC power source in the first and second embodiments, system power source 1 may be a DC power source. When system power source 1 is a DC power source, power conversion devices 100 and 200 shown in FIGS. 1 and 6, respectively, may not include converter 111. Further, while in power conversion devices 100 and 200 the three-phase AC power output from system power source 1 is output to three power lines, system power source 1 may output AC power in a single phase or the three-phase AC power output from system power source 1 may be output to four power lines.

The embodiments disclosed herein are also intended to be combined within a consistent scope as appropriate and thus implemented. It should be understood that the embodiments disclosed herein have been described for the purpose of illustration only and in a non-restrictive manner in any respect. The scope of the present disclosure is defined by the terms of the claims, rather than the description above, and is intended to include any modifications within the meaning and scope equivalent to the terms of the claims.

REFERENCE SIGNS LIST

1 system power source, 2 compressor, 3 controller, 10 outdoor unit, 12, 22 heat exchanger, 13 four-way valve, 20 indoor unit, 21 expansion valve, 91 circuitry, 92 memory, 93 input/output unit, 100, 200 power conversion device, 101, 101A error detection unit, 102 control unit, 110 power conversion unit, 111 converter, 112 inverter, 130 noise suppression unit, 131, 131A noise suppression signal generation unit, 132 input signal detection unit, 133 power detection unit, 134 output signal detection unit, 135 input unit, 136 output unit, 900 air conditioner.

The invention claimed is:

1. A power conversion device to supply power to a load, comprising:
    a power conversion unit to receive power from a first power source;
    a control unit to control the power conversion unit;
    a noise suppression unit connected between the first power source and the power conversion unit, the noise suppression unit outputting a noise suppression signal to suppress noise generated from the power conversion unit; and
    an error detection unit to detect an error when an error condition is established, the error condition indicating that the error has occurred in the power conversion device or the load, wherein
    the error condition includes a condition that the noise is larger in amount than a reference value.

2. The power conversion device according to claim 1, wherein
    the noise suppression unit includes a power source detection unit to detect at least one of a voltage and a current of a second power source that supplies power to the noise suppression unit and to output a detected value of the second power source to the error detection unit, and
    the error condition includes a second condition that the detected value of the second power source does not fall within a predetermined range.

3. The power conversion device according to claim 1, wherein
the noise suppression unit includes an input signal detection unit to detect at least one of a voltage and a current of an input signal of the noise suppression unit and to output a detected value of the input signal to the error detection unit, and
the error condition includes a condition that the detected value of the input signal does not fall within a predetermined range.

4. The power conversion device according to claim 1, wherein
the noise suppression unit includes an output signal detection unit to detect at least one of a voltage and a current of an output signal of the noise suppression unit and to output a detected value of the output signal to the error detection unit, and
the error condition includes a condition that the detected value of the output signal does not fall within a predetermined range.

5. The power conversion device according to claim 1, wherein
the error detection unit calculates a specific frequency component included in a noise signal input from the noise suppression unit, and
the error condition includes a condition that the specific frequency component has a magnitude larger than a reference value.

6. The power conversion device according to claim 1, wherein when the error condition is established, the error detection unit outputs to the control unit an error signal indicating that an error has occurred in the power conversion device or the load.

7. The power conversion device according to claim 6, wherein the control unit switches a mode of operation of the power conversion unit in response to the error signal being received from the error detection unit.

8. The power conversion device according to claim 6, wherein, in response to the error signal being received from the error detection unit, the control unit outputs, to a device external to the power conversion device, that an error has occurred in the power conversion device or the load.

9. The power conversion device according to claim 1, wherein the error detection unit learns a state of the power conversion device through machine-learning using at least one of a detected value of an input signal of the noise suppression unit and a detected value of an output signal of the noise suppression unit as training data, and detects an error or symptom thereof of the power conversion unit or the load from the detected value of the input signal and the detected value of the output signal.

10. An air conditioner comprising:
the power conversion device according to claim 1; and
a compressor to receive power from the power conversion device.

* * * * *